United States Patent
Matsumoto (10) Patent No.: US 12,149,833 B2
(45) Date of Patent: Nov. 19, 2024

(54) APPARATUS, METHOD THEREOF, AND STORAGE MEDIUM FOR ADJUSTING AN IMAGE QUALITY OF AN IMAGE FOR LIVE VIEW DISPLAY

(71) Applicant: CANON KABUSHIKI KAISHA, Tokyo (JP)

(72) Inventor: Yukihiro Matsumoto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 17/723,252

(22) Filed: Apr. 18, 2022

(65) Prior Publication Data
US 2022/0353403 A1 Nov. 3, 2022

(30) Foreign Application Priority Data

Apr. 28, 2021 (JP) .................. 2021-076750

(51) Int. Cl.
*H04N 23/73* (2023.01)
*G03B 17/14* (2021.01)

(52) U.S. Cl.
CPC ............ *H04N 23/73* (2023.01); *G03B 17/14* (2013.01)

(58) Field of Classification Search
CPC ...... H04N 5/77; H04N 23/634; H04N 23/959; H04N 23/71; H04N 23/667; H04N 23/67; H04N 23/73; H04N 23/75; H04N 23/63; H04N 23/74; H04N 25/00; G03B 9/02; G03B 7/00; G02B 7/09; G02B 7/28
See application file for complete search history.

(56) References Cited

U.S. PATENT DOCUMENTS

| | | | | |
|---|---|---|---|---|
| 4,739,411 A * | 4/1988 | Bolton | ............... | H04N 23/634 348/346 |
| 2009/0268075 A1* | 10/2009 | Yumiki | ............... | H04N 23/633 348/E5.022 |
| 2011/0221930 A1* | 9/2011 | Katsumata | ............. | H04N 23/68 348/226.1 |
| 2014/0169778 A1* | 6/2014 | Nakakusu | .............. | H04N 23/71 396/82 |
| 2014/0300779 A1* | 10/2014 | Yeo | ...................... | H04N 23/71 348/234 |

(Continued)

FOREIGN PATENT DOCUMENTS

JP 2001169154 A 6/2001
JP 2007158878 A 6/2007

Primary Examiner — John W Miller
Assistant Examiner — Humam M Satti
(74) Attorney, Agent, or Firm — Canon U.S.A., Inc. IP Division (57) ABSTRACT

An apparatus includes a control unit that executes exposure control by adjusting a shutter speed, an aperture value, and a sensitivity, and a setting unit that switches on/off a simulation function for adjusting an image quality of an image for live view display to match an image quality depending on an aperture opening for acquiring a still image for recording. If the simulation function is on, the control unit controls a difference amount between an aperture value for acquiring the image for live view display and an aperture value for acquiring the still image depending on an aperture value for acquiring the still image for recording such that the difference amount when the aperture value for the still image is a second value larger than a first value is larger than that when the aperture value for the still image is the first value.

20 Claims, 5 Drawing Sheets

(56) References Cited

U.S. PATENT DOCUMENTS

2016/0119538 A1* 4/2016 Kim .................... H04N 23/617
   348/360
2017/0230583 A1* 8/2017 Kudo .................... H04N 23/71

* cited by examiner

APPARATUS, METHOD THEREOF, AND STORAGE MEDIUM FOR ADJUSTING AN IMAGE QUALITY OF AN IMAGE FOR LIVE VIEW DISPLAY

BACKGROUND

Technical Field

The aspect of the embodiments relates to an apparatus, a control method thereof, and a storage medium, and more particularly to exposure control for an image to be used for live view display.

Description of the Related Art

A function (live view display) for continuously acquiring images by capturing images of an object and sequentially displaying the acquired images on a display apparatus has heretofore been known. During the live view display, changes in brightness (exposure) of an image by adjustment can be simulated by adjusting exposure parameters, such as an aperture, a shutter speed, and an International Organization for Standardization (ISO) sensitivity. In other words, a user can preliminarily check the brightness (exposure) of an image to be obtained by changing the exposure during the live view display.

If the aperture, which is one of the exposure parameters that can be changed during the live view display, is adjusted, not only the brightness in an image, but also the depth of field changes. For example, if the depth of field can be changed in response to changes in aperture (aperture value) on live view display during still image capturing, the user can preliminarily check changes in the depth of field in response to changes in the aperture.

For example, Japanese Patent Application Laid-Open No. 2001-169154 discusses a technique for setting an aperture for still image capturing (image capturing aperture) during the live view display in response to a user's operation on a depth-of-field preview button provided on a camera.

Japanese Patent Application Laid-Open No. 2007-158878 discusses a technique for setting an aperture value for acquiring an image for live view display to a value that matches an aperture for still image acquisition (image capturing aperture).

SUMMARY

An apparatus that includes a sensor and is configured to control an aperture includes a detection unit configured to detect a luminance of an object, a control unit configured to execute an exposure control by adjusting at least one of parameters based on a result of the detection by the detection unit, the parameters including a shutter speed, an aperture value, and a sensitivity, and a setting unit configured to switch on and off a simulation function for adjusting an image quality of an image for live view display on a display apparatus to match an image quality corresponding to an opening of the aperture for acquiring a still image for recording. In a case where the simulation function is on, the exposure control unit controls (1) a difference amount between an aperture value for acquiring the image for live view display and an aperture value for acquiring the still image depending on an aperture value for acquiring the still image for recording and (2) the difference amount such that the difference amount obtained when the aperture value for acquiring the still image corresponds to a second aperture value is larger than the difference amount obtained when the aperture value for acquiring the still image corresponds to a first aperture value, the second aperture value being larger than the first aperture value.

Further features of the disclosure will become apparent from the following description of exemplary embodiments with reference to the attached drawings.

BRIEF DESCRIPTION OF THE DRAWINGS

FIGS. 4A, 4B, and 4C each illustrate a program diagram for still image acquisition according to the exemplary embodiment when the depth simulation function is on.

DESCRIPTION OF THE EMBODIMENTS (Basic Configuration of Digital Camera)

Figure 1:
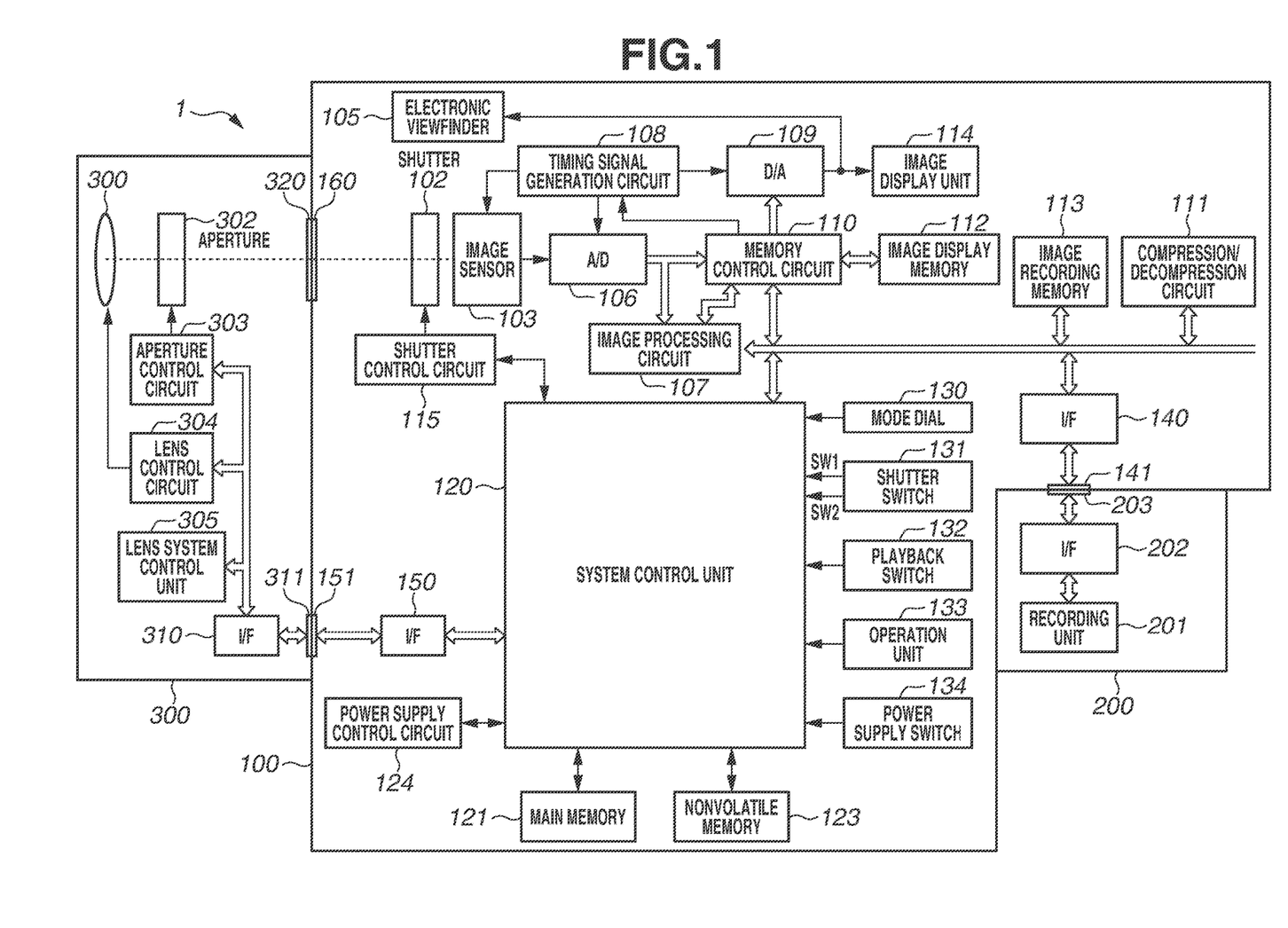
FIG. 1 is a block diagram illustrating a configuration example of a digital camera as an image capturing apparatus according to an exemplary embodiment of the disclosure.

A preferred first exemplary embodiment of the disclosure will be described below with reference to the accompanying drawings. FIG. 1 is a block diagram illustrating a configuration example of a digital camera (hereinafter simply referred to as a camera) 1 as an image capturing apparatus according to an exemplary embodiment of the disclosure.

One or more functional blocks illustrated in FIG. 1 may be implemented by hardware such as an application specific integrated circuit (ASIC) or a programmable logic array (PLA), or may be implemented by executing software by a programmable processor such as a central processing unit (CPU) or a micro processing unit (MPU). Alternatively, one or more functional blocks may be implemented by a combination of software and hardware. In the following description, even if different functional blocks are described as units that mainly perform operations, such units may be implemented by the same hardware. As illustrated in FIG. 1, the camera 1 according to the present exemplary embodiment is a so-called lens-interchangeable image capturing apparatus including a camera unit 100, an external recording medium 200, and a lens unit 300. However, the configuration of the camera 1 is not limited to such an apparatus. For example, the camera unit 100 and the lens unit 300 may be integrally formed.

A shutter 102 is a light-shielding member for opening or shielding an optical path between the lens unit 300 and an image sensor 103. The image sensor 103 is a charge accumulation solid-state image sensor, such as a charge-coupled device (CCD) sensor or a complementary metal-oxide semiconductor (CMOS) sensor, and functions as an image capturing unit that photoelectrically converts (captures an image of) object light emitted through the lens unit 300 and generates analog image data.

An electronic viewfinder 105 is an electronic finder that enables a user to check an object image using a thin-film transistor driving liquid crystal display (TFT-type LCD) or an organic electroluminescence (EL) device.

An analog-to-digital (A/D) conversion unit 106 is a conversion unit that converts the analog image data output from the image sensoe 103 into digital image data. An image processing circuit 107 is an image processing unit that performs various processing, such as white balance adjustment and gradation processing, on the digital image data output from the A/D conversion unit 106.

A timing signal generation circuit 108 is a timing signal generation unit that generates a signal (a control signal such as a clock signal) for causing, for example, the image sensor 103, the A/D conversion unit 106, and a digital-to-analog (D/A) conversion unit 109 to be described below to operate.

The timing signal generation circuit 108 controls the timing of resetting accumulated charges in the image sensor 103, thereby controlling the accumulation of charges in the image sensor 103.

The timing signal generation circuit 108 is controlled by a system control unit 120 described below.

A memory control circuit 110 is a memory control unit that controls the A/D conversion unit 106, the image processing circuit 107, the D/A conversion unit 109, and a compression/decompression circuit 111, and executes control for writing the acquired image data into an image display memory 112 or an image recording memory 113.

An image display unit 114 is a display unit that uses, for example, a TFT-type LCD or an organic EL device, similarly to the electronic viewfinder 105 described above. The digital image data for display written into the image display memory 112 is converted into analog image data for display by the D/A conversion unit 109, and is then displayed on the electronic viewfinder 105 or the image display unit 114.

The image recording memory 113 is a recording unit that stores image data acquired by capturing an image of an object, and has a sufficient storage capacity for storing a predetermined number of still image data and moving image data. The image recording memory 113 can also be used as a work area for the system control unit 120 described below.

The compression/decompression circuit 111 is a compression/decompression unit that loads image data stored in the image recording memory 113 and compresses and decompresses the image data according to a predetermined image compression method and a predetermined image decompression method depending on various applications.

A shutter control circuit 115 is a shutter control unit that controls the operation of the shutter 102, and controls the operation of the shutter 102 based on a result of an object photometry operation result calculated by the system control unit 120. The shutter 102 can be controlled in conjunction with the control of an aperture 302 described below.

The system control unit 120 is a system control unit that controls the operation of the camera 1 in an integrated manner. The system control unit 120 functions as an exposure control unit that controls the exposure, or as a focus control unit that performs focus control based on a focus detection result, based on image data obtained by capturing an image by the image sensoe 103 as described above. Specifically, the system control unit 120 controls a lens position (i.e., focus control) based on contrast information about the acquired image data while shifting the focus lens position using image data obtained by capturing an image with the image sensor 103. In another focus control method, the system control unit 120 detects an in-focus state of an optical image based on a difference between phases of two images of the object based on the captured image data, and controls the lens position (i.e., focus control) based on the focus detection result.

The system control unit 120 can also perform a photometry operation for calculating a luminance value for the object using image data obtained by capturing an image with the image sensor 103. In the exposure control for acquiring image data by capturing an image of the object, the system control unit 120 adjusts exposure parameters, such as an aperture value, a shutter speed, and an image capturing sensitivity (e.g., International Organization for Standardization (ISO) sensitivity). The aperture value is a parameter regarding the opening rate of the aperture 302. The shutter speed is a parameter regarding a charge accumulation time in the image sensor 103. The image capturing sensitivity is a parameter regarding the amount of analog gain and the amount of digital gain.

The system control unit 120 also includes a timer function using a system clock (not illustrated. Using the timer function, the system control unit 120 manages, for example, temporal information set by the user based on an operation through an operation unit 133, and temporal information such as an image capturing interval, and the present time. The system control unit 120 can thus set an appropriate exposure corresponding to the luminance value based on various information such as the object luminance, exposure control, and time described above.

A main memory 121 is a recording unit that records data on the operation of the camera 1, such as information (program diagram using table data or the like) about exposure (appropriate exposure) for the luminance value, constants for operations to be executed by the camera 1, various exposure conditions, and calculation formulas. A nonvolatile memory 123 is an electrically erasable and programmable storage unit such as an electrically erasable programmable read-only memory (EEPROM) as typified by, for example, a flash memory.

Each unit to be described below is an operation unit for inputting various operation instructions to the system control unit 120, and is composed of a button, a switch, a dial, a touch panel, a line-of-sight detection device, or an audio recognition device, or a combination thereof.

A mode dial 130 is an operation member used to set any image capturing mode from among a plurality of image capturing modes that can be set by the camera unit 100. The camera 1 can set a normal still image mode for executing image capturing to acquire a still image and a moving image mode for recording a moving image. Further, the camera 1 according to the present exemplary embodiment can set various modes for automatically or manually setting exposure parameters in each of a still image capturing mode and a moving image capturing mode. The examples of the various modes include e an automatic mode, a program mode, an aperture priority mode, a shutter speed priority mode, and a manual mode.

In still image capturing, an image (live view image) is displayed on the electronic viewfinder 105 or the image display unit 114 to thereby implement a live view display function so as to check an object. The live view display function is a function for sequentially displaying a plurality of pieces of acquired image data by continuously executing charge accumulation (image capturing) processing using the image sensor 103.

A shutter switch 131 is an operation member used to instruct to start an object image capturing preparation operation or an image capturing operation. A switch 1 (SW1) is turned on by a first stroke (e.g., half-depression) of the shutter switch 131. When the SW1 is turned on, the image capturing preparation operation is started and the system control unit 120 starts, for example, focus control processing, exposure control processing, and auto white balance (AWB) processing.

Further, a switch 2 (SW2) is turned on by a second stroke (e.g., full-depression) of the shutter switch 131. When the SW2 is turned on, the image capturing operation is started and the system control unit 120 starts exposure processing and recording processing for charge accumulation (image capturing) using the image sensor 103.

In the exposure processing, signals read out from the image sensoe 103 are written into the image recording memory 113 as image data through the A/D conversion unit 106 and the memory control circuit 110 in response to an instruction from the system control unit 120. In response to an instruction from the system control unit 120, development processing based on various operations in the image processing circuit 107 and the memory control circuit 110 is executed on the image data, and the image data obtained after the development processing is written into the image recording memory 113.

In recording processing, the image data that is read out from the image recording memory 113 and is subjected to the development processing is compressed by the compression/decompression circuit 111 in response to an instruction from the system control unit 120. Thereafter, in response to an instruction from the system control unit 120, the image data obtained after the compression processing is written into a recording unit 201 of the external recording medium 200 through a first camera interface (I/F) 140, a first camera connector 141, a media connector 203, and a media I/F 202.

A playback switch 132 is an operation member for reading out the acquired image data from the image recording memory 113 or the external recording medium 200 and instructing to start playback processing to be displayed on the image display unit 114.

The operation unit 133 is an operation member used for making various settings regarding menu display and image capturing and making various settings for playback. For example, the user can make a setting for turning on or off a depth-of-field simulation function during live view display by operating the operation unit 133 in a state where a menu for the depth-of-field simulation function is displayed. In the camera 1 according to the present exemplary embodiment, the user can select whether to simulate the depth of field in a still image obtained by capturing an image of the object during live view display. The depth-of-field simulation is hereinafter simply referred to as a depth simulation. In the depth simulation, an aperture control for live view display is performed such that an image for live view display can reproduce the depth of field based on the opening of the aperture for still image acquisition (image capturing aperture). In other words, the user can check the depth of field based on the aperture value for acquiring a still image for recording during live view display. In contrast, if the depth simulation is not performed, the exposure parameters, including the aperture value, are controlled based on the exposure control suitable for live view display, regardless of the image capturing aperture used for still image acquisition.

A power supply switch 134 is an operation member for switching on and off the power supply to each unit of the camera 1 from a power supply unit (battery) (not illustrated). Operating the power supply switch 134 makes it possible to switch on and off the power supply not only to the camera unit 100, but also to various accessory devices, such as the lens unit 300 and the external recording medium 200, that are connected to the camera unit 100.

A power supply control circuit 124 is a power supply control unit including a battery detection circuit, a direct-current (DC)-DC converter, and a switch circuit used for switching an energization block. The power supply control circuit 124 detects attachment or detachment of a battery, the type of the battery, and the remaining battery capacity based on an instruction from the system control unit 120 in accordance with an operation on the power supply switch 134, and supplies a required voltage to each unit of the camera 1 for a required period of time.

A second camera I/F 150 is an interface that is provided on a camera mount portion 160 and connects the camera unit 100 and the lens unit 300 to each other. A second camera connector 151 is a connection unit that electrically connects the camera unit 100 and the lens unit 300 through a lens connector 311 and a lens I/F 310. The second camera connector 151 can transmit, for example, a control signal, a state signal, and a data signal between the camera unit 100 and the lens unit 300, and can supply currents of various voltages. The second camera connector 151 may be configured to perform not only an electric communication, but also, for example, an optical communication and an audio communication.

The external recording medium 200 is an external recording device such as a memory card or a hard disk. The external recording medium 200 includes the recording unit 201, which is composed of a semiconductor memory, a magnetic disk, or the like, the media I/F 202 for the camera unit 100, and the media connector 203 for connecting to the camera unit 100.

The lens unit 300 is an optical device that is detachably attachable to the camera unit 100.

A lens mount portion 320 is a connection unit that engages with the camera mount portion 160 and mechanically attaches the lens unit 300 to the camera unit 100. Inside the lens mount portion 320, the lens connector 311 for electrically connecting the lens unit 300 and the camera unit 100 is provided.

The lens connector 311 can transmit, for example, a control signal, a state signal, and a data signal between the lens unit 300 and the camera unit 100, and can receive and supply currents of various voltages. The lens connector 311 may be configured to perform not only an electrical communication, but also, for example, an optical communication, and an audio communication.

An image capturing lens group 301 is an optical member including a focus lens, a zoom lens, and a shift lens. The aperture 302 is a light amount adjustment member that adjusts the amount of an optical light beam that passes through the image capturing lens group 301 and is incident on the image sensor 103.

An aperture control circuit 303 is an aperture control unit that controls the open area amount of the aperture 302 based on an instruction from the system control unit 120. The system control unit 120 instructs the aperture control circuit 303 to change the aperture diameter of the aperture 302 to match the open area amount corresponding to a target aperture value. The aperture diameter of the aperture 302 that is being changed is sequentially detected by communication between the lens unit 300 and the camera unit 100. The system control unit 120 then finishes changing the aperture diameter of the aperture 302 when the aperture diameter of the aperture 302 reaches the aperture diameter corresponding to the target aperture value.

A lens control circuit 304 is a lens driving control unit that controls the operation (driving) of the image capturing lens group 301. The lens control circuit 304 can detect the lens position (focus position) of the focus lens. Information about the detected lens position is transmitted to the camera unit 100.

A lens system control unit 305 is a lens control unit that controls the operation of the lens unit 300 in an integrated manner. The lens system control unit 305 incorporates a CPU, a volatile memory, and a nonvolatile memory (not illustrated). The volatile memory stores, for example, constants, variables, and programs for operations. The nonvolatile memory stores, for example, identification information, such as unique numbers for the lens unit 300, management information, and function information, such as a maximum aperture value, a minimum aperture value, and a focal length. The camera 1 has the basic configuration as described above.

(Operation of Camera During Depth Simulation)

Figure 2:
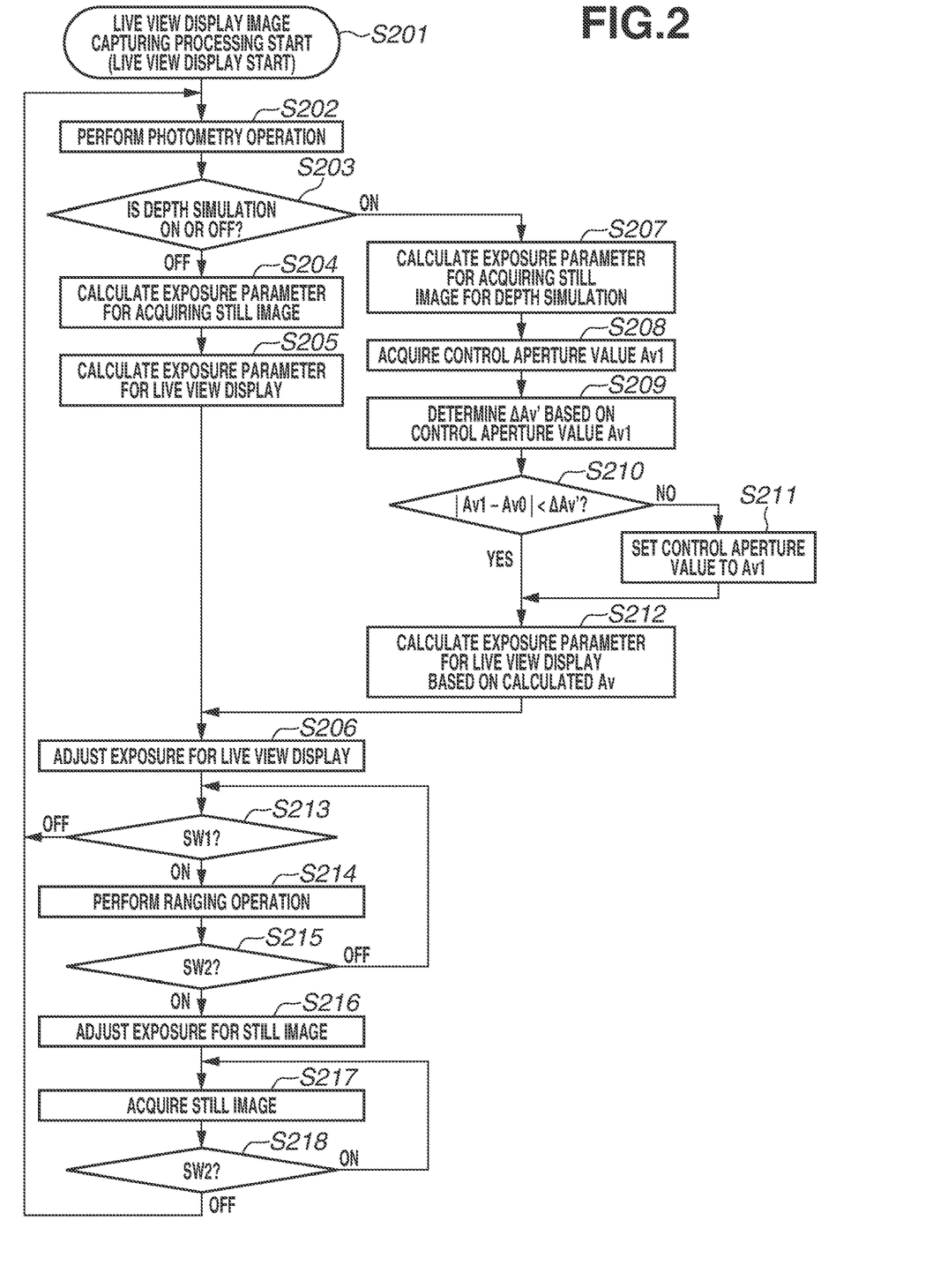
FIG. 2 is a flowchart illustrating image capturing processing during live view display according to a first exemplary embodiment of the disclosure.

Various operations of the camera 1 when the above-described depth simulation function is on will now be described with reference to a flowchart illustrated in FIG. 2. FIG. 2 is a flowchart illustrating image capturing processing during live view display according to the first exemplary embodiment of the disclosure.

In step S201, image capturing processing is started upon start of a live view display.

The live view display is started in response to, for example, power-on of the camera 1. The operation of the camera 1 based on which the live view display is started is not limited to such an operation. For example, the image capturing processing may be started when the live view display is turned on by a user's manual operation.

In step S202, the system control unit 120 executes a photometry operation based on images captured by the image sensoe 103 at a predetermined interval. Any known method may be employed as a photometry operation method. In the present exemplary embodiment, an average luminance value for each block obtained by dividing the entire captured image into a plurality of areas is calculated and the average luminance value for all blocks is set as a representative luminance of the captured image in a state where predetermined weighting processing is performed on the average luminance value for each block. The representative luminance is used as the photometry operation result for the captured image.

In step S203, the system control unit 120 checks the current setting for depth simulation. If the depth simulation function is off (OFF in step S203) the processing proceeds to step S204. If the depth simulation function is on (ON in step S203), the processing proceeds to step S207.

In step S204, the system control unit 120 calculates an exposure parameter for still image acquisition based on the photometry operation result obtained in step S202.

Figure 3A:
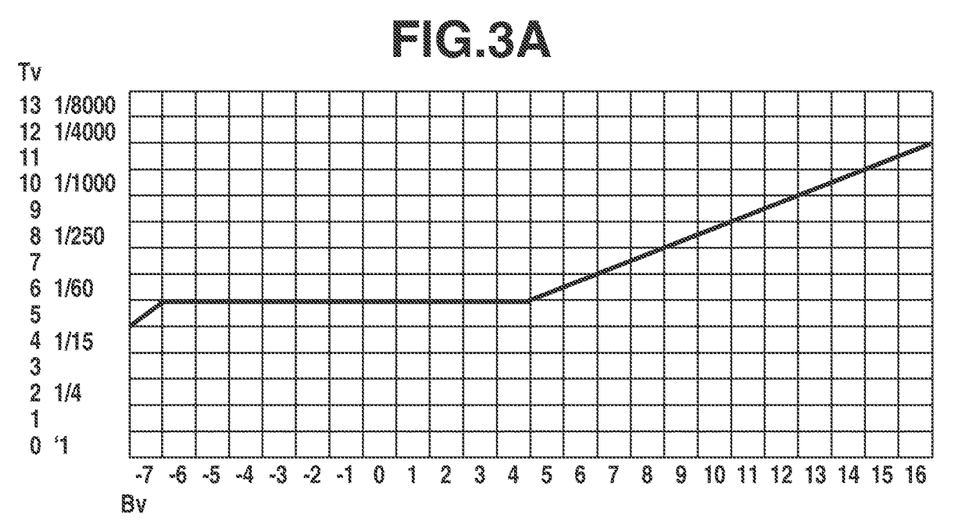
FIGS. 3A, 3B, and 3C each illustrate a program diagram for still image acquisition according to the exemplary embodiment when a depth simulation function is off.
Figure 3B:
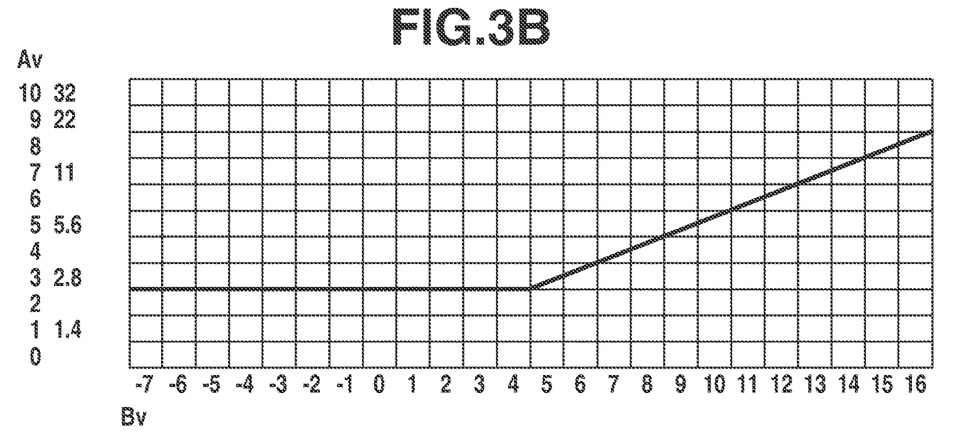
Figure 3C:
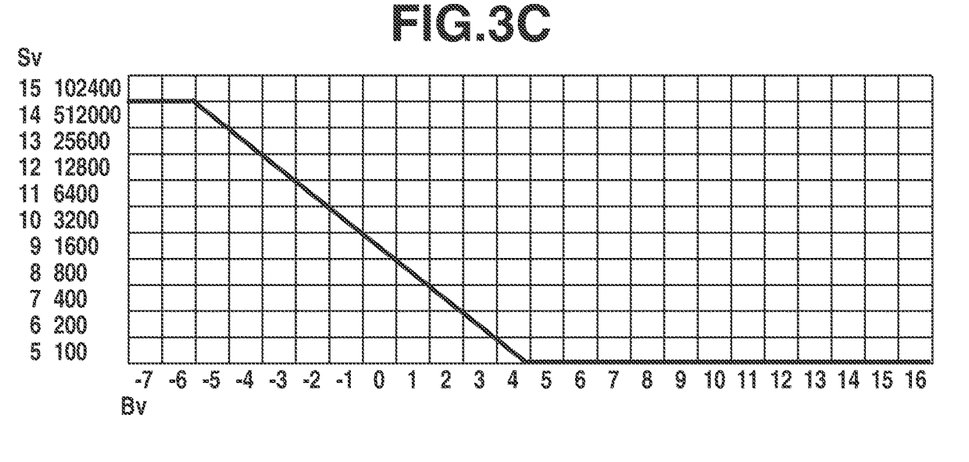

The exposure parameter for still image acquisition is calculated based on a predetermined program diagram that is preliminarily stored in the camera 1. FIGS. 3A to 3C each illustrate a program diagram for still image acquisition according to the present exemplary embodiment when the depth simulation function is off. Each program diagram illustrated in FIGS. 3A to 3C is a diagram used in a program mode for still image capturing in which the normal image capturing mode is set. FIGS. 3A to 3C illustrate program diagrams for a shutter speed (Tv), an aperture value (Av), and an image capturing sensitivity (Sv), respectively.

As illustrated in FIGS. 3A to 3C, when the depth simulation function is off, the exposure parameters are changed in response to changes in luminance value By. For example, in a range below a luminance value Bv4, the image capturing sensitivity (Sv) is changed in response to changes in the luminance value, and in a range above the luminance value Bv4, the shutter speed (Tv) and the aperture value (Av) are changed to increase as the luminance value increases. In other words, if the depth simulation is off, changes in specific exposure parameters are not decreased in response to changes in the luminance value of the object.

Referring again to FIG. 2, in step S205, the system control unit 120 calculates an exposure parameter for live view display with reference to the photometry operation result calculated in step S202 and the program diagram for live view display preliminarily stored in the camera 1.

In step S207, the system control unit 120 calculates an exposure parameter for acquiring a still image for depth simulation based on the photometry operation result obtained in step S202.

Figure 4A:
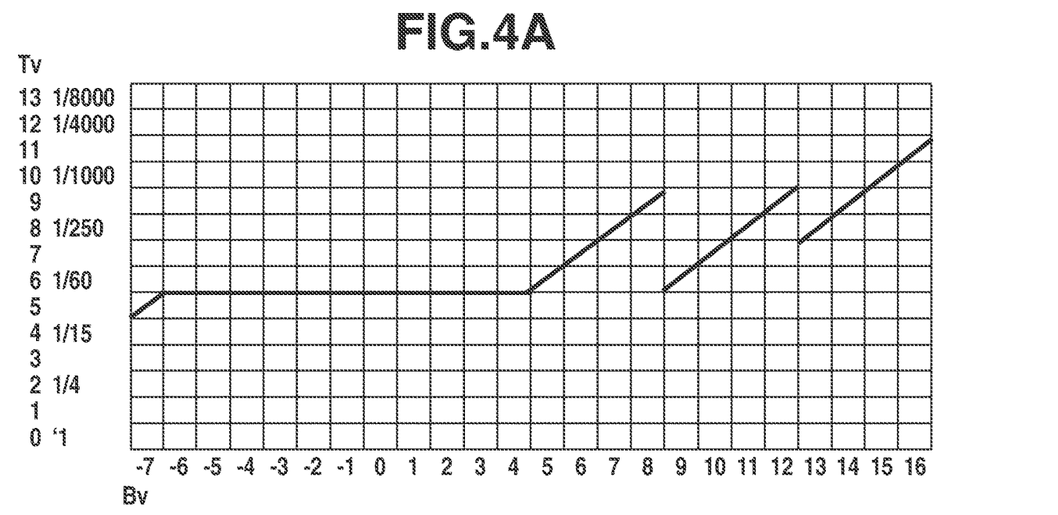
Figure 4B:
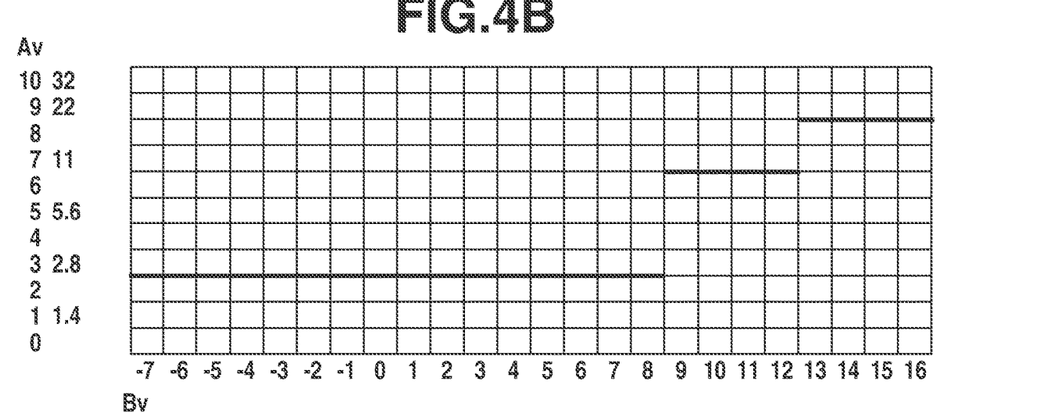
Figure 4C:
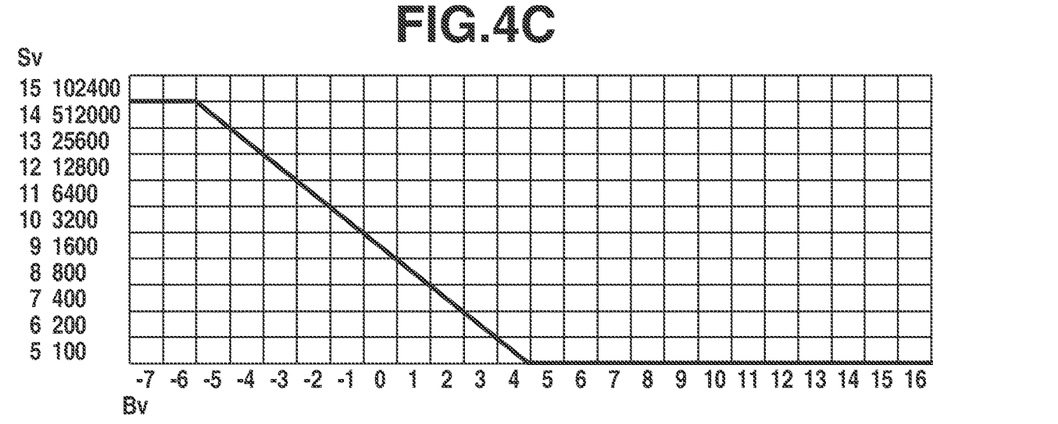

FIGS. 4A to 4C each illustrate a program diagram for still image acquisition according to the present exemplary embodiment when the depth simulation function is on. Each program diagram illustrated in FIGS. 4A to 4C is a program diagram used in the program mode for still image capturing when the depth simulation is executed in the image capturing mode. FIGS. 4A, 4B, and 4C illustrate programs for the shutter speed (Tv), the aperture value (Av), and the image capturing sensitivity (Sv), respectively.

As illustrated in FIGS. 4A to 4C, when the depth simulation function is on, the exposure parameters are changed such that the aperture value is not changed and is kept at a substantially constant value even when the luminance value By is changed. For example, in a luminance value range above the luminance value B4, the shutter speed (Tv) is changed to increase as the luminance value increases, and the aperture value (Av) is changed stepwise so that the aperture value indicates a substantially constant value in response to changes in the luminance value. In other words, the system control unit 120 controls the aperture value (Av) to discretely change in response to changes in the luminance of the object in the program diagram illustrated in FIG. 4B in the entire range of aperture values that is set by the camera 1.

Specifically, as illustrated in FIG. 4B, F2.8 is set in the range of By-7<By≤Bv8, F11 is set in the range of Bv8<By≤Bv12, and F22 is set in the range of Bv12<By≤Bv16. That is, when the depth simulation function is on, the exposure control is performed to reduce the amount of changes in the aperture value (Av) in response to changes in the luminance value of the object. In other words, the number of aperture values that can be controlled by the camera 1 when the depth simulation function is on is smaller than the number of aperture values that can be set by the camera 1 when the depth simulation function is off. Unlike the aperture value that can be set in response to changes in the luminance of the object, exposure parameters other than the aperture value can be set regardless of whether the depth simulation function is on or off. The number of exposure parameters that can be set may vary depending on other image capturing conditions, such as an image capturing speed during continuous shooting and a frame rate during live view display.

In the program diagrams illustrated in FIGS. 4A to 4C, a hysteresis characteristic that makes the change point of each exposure parameter value different between a change in the luminance value to the high luminance side and a change in the luminance value to the low luminance side may be provided in each program diagram.

Referring again to FIG. 2, in step S208, the system control unit 120 acquires (reads out) a control aperture value (referred to as "Av1") in the exposure parameter calculated in step S207. The control aperture value is a target value for controlling the aperture 302.

In step S209, the system control unit 120 determines an allowable difference amount ΔAv' based on the control aperture value Av1 for still image acquisition calculated in advance. When the depth simulation function is on, the depth simulation is performed such that the image for live view display has a depth of field similar to that for still image acquisition. In this case, if the difference between the depth of field in the aperture for live view display and the depth of field in the image capturing aperture for still image acquisition is within an allowable range, the control aperture value for acquiring a still image need not match the aperture value for acquiring an image for live view display. In particular, the aperture 302 is configured to adjust the light amount by mechanically driving members, and thus it may be desirable to prevent unnecessary driving of the aperture 302 so as to prevent deterioration in durability, readiness (instant shooting performance), and continuous shooting performance.

Accordingly, the camera 1 according to the present exemplary embodiment sets the allowable difference amount ΔAv' depending on the aperture value and determines whether to newly drive the aperture 302 for live view display based on whether the difference between the current aperture value Av0 and the aperture value Av1 for still image acquisition falls within the allowable difference amount ΔAv'. If the difference between the aperture value Av0 and the aperture value Av1 for still image acquisition does not fall within the allowable difference amount ΔAv', the camera 1 according to the present exemplary embodiment drives the aperture 302 for live view display depending on the aperture value for still image acquisition. In other words, if the difference between the aperture value Av0 and the aperture value Av1 for still image acquisition falls within the allowable difference amount ΔAv', the camera 1 according to the present exemplary embodiment does not newly drive the aperture 302 for live view display.

The depth of field can be calculated based on the following expressions (1) and (2).

$$\text{Front Depth of Field} = \frac{\text{Diameter of Permissible Circle of Confusion} \times F\text{-value} \times \text{Object Distance}^2}{\text{Focal Length}^2 + \text{Diameter of Permissible Circle of Confusion} \times F\text{-value} \times \text{Object Distance}} \quad (1)$$

$$\text{Rear Depth of Field} = \frac{\text{Diameter of Permissible Circle of Confusion} \times F\text{-value} \times \text{Object Distance}^2}{\text{Focal Length}^2 - \text{Diameter of Permissible Circle of Confusion} \times F\text{-value} \times \text{Object Distance}} \quad (2)$$

As described in the above-described expressions (1) and (2), the depth of field increases as the aperture value increases or as the aperture diameter of the aperture 302 decreases. Accordingly, the difference in the depth of field in an image is less noticeable as the aperture value increases, and the effect on the depth simulation due to the difference between the aperture value for still image acquisition and the aperture value for live view display is small. For this reason, the camera 1 according to the present exemplary embodiment sets the allowable difference amount ΔAv' to a large value as the current aperture value Av0 increases.

For example, the allowable difference amount Av' is set such that a resolution level of ⅓ of a minimum resolution is set until the rear depth of field reaches about 1/10 of an object distance, and a resolution level of one of a minimum resolution is set under conditions where the rear depth of field exceeds 1/10. Specifically, a scene for taking an upper body photo using a lens with a focal length of 85 mm and a maximum aperture value of F1.2 is assumed. In such a scene, an image of an object is captured in many cases assuming that the focal length is represented by f and a predetermined value "30" is set as a relative distance between the camera 1 and the object (i.e., at a distance of 30f). For example, assuming that an image of an object is captured at a distance of 2 m, under this condition, the depth of field is about 0.22 m that is 1/10 of the object distance when an aperture value F8 is set. Under this condition, the allowable difference amount ΔAv' is switched at the aperture value F8. In this example, only one threshold is set, but instead a plurality of thresholds may be set. Alternatively, a hyperfocal distance may be set as a threshold.

Referring again to FIG. 2, as described above, in step S210, the system control unit 120 determines whether the difference between the control aperture value Av1 obtained in advance and the current aperture value (control aperture value) Av0 is smaller than the allowable difference amount ΔAv'. If it is determined that the difference between Av1 and Av0 is smaller than the allowable difference amount ΔAv' (YES in step S210), it is determined that there is no need to newly drive the aperture for depth simulation. The processing then proceeds to step S212 without changing the aperture value from the current aperture value Av0. In other words, if the determination result in step S210 is "YES", the depth simulation is performed at the current aperture value Av0.

If it is determined that the difference between Av1 and Av0 is larger than or equal to the allowable difference amount ΔAv' (NO in step S210), it is determined that there is a need to newly drive the aperture for depth simulation. The processing then proceeds to step S211. In step S211, the control aperture value is set to Av1. In other words, if the determination result in step S210 is "NO", it is determined that the depth simulation cannot be performed using the current aperture value Av0 in the same manner as the depth simulation using the aperture value for still image acquisition. Thus, the depth simulation is performed using the newly calculated aperture value Av1.

In step S212, the system control unit 120 calculates an exposure parameter (shutter speed, image capturing sensitivity) other than the aperture value based on the aperture value (Av0 or Av1) determined in advance and the photometry operation result (representative luminance value) obtained in step S202. In step S212, the exposure parameter other than the aperture value is calculated based on the same program diagram for live view display as that described above in step S205.

In step S206, the system control unit 120 executes the exposure control based on the exposure parameter calculated in step S205 or step S212. Specifically, in step S206, the system control unit 120 controls the aperture 302 to be driven based on the aperture value obtained in advance. Then, the processing proceeds to step S213.

In step S213, the system control unit 120 determines whether the SW1 of the shutter switch 131 is on. If it is determined that the SW1 is on (ON in step S213), the processing proceeds to step S214. If it is determined that the SW1 is off (OFF in step S213), the processing returns to step S202 to repeatedly perform the subsequent processing.

If it is determined that the SW1 is on (ON in step S213), the processing proceeds to step S214. In step S214, the system control unit 120 performs a ranging operation for autofocus (AF) control. In step S215, the system control unit 120 determines whether the SW2 of the shutter switch 131 is on. The determination processing in steps S213 to S215 is repeated until the SW2 is turned on.

In step S216, the system control unit 120 executes the exposure control based on the exposure parameter for still image acquisition obtained in step S204 or step S207. When the depth simulation is performed and there is a difference of a value within the allowable difference amount $\Delta Av'$ between the aperture for live view display and the image capturing aperture for still image acquisition, in step S217, the system control unit 120 drives the aperture 302 depending on the control aperture Av1 for still image acquisition.

In step S217, each unit of the camera 1 is controlled to acquire a still image by capturing an image of the object. In step S218, the system control unit 120 determines whether the SW2 of the shutter switch 131 is off. If it is determined that the SW2 is on in step S218 (ON in step S218), the processing returns to step S217 to repeatedly perform the processing of steps S217 and S218. If it is determined that the SW2 is off (OFF in step S218) the processing returns to step S202. In a case where, for example, an instruction to interrupt the live view display or to power off the camera 1 is issued from the user, the image capturing processing during live view display illustrated in FIG. 2 is terminated.

The camera 1 according to the present exemplary embodiment is configured not to perform the photometry operation again in response to the state of the SW1 of the shutter switch 131 as illustrated in the flowchart of FIG. 2. However, the configuration of the camera 1 is not limited to this configuration. For example, the camera 1 may be configured to further perform the photometry operation during the determination processing of steps S213 to S215 and to perform the processing of step S216 (exposure adjustment) based on the photometry operation result. In such a case, there may be a difference between the depth of field in the still image and the result of the depth simulation executed during live view display. It is, however, less likely that the photometry operation result may be greatly changed before and after the SW1 is turned on.

The camera 1 according to the present exemplary embodiment is also configured to continuously acquire still images without performing photometry and ranging operations in a state where the SW2 of the shutter switch 131 is turned on after still image acquisition as illustrated in the flowchart of FIG. 2. However, the configuration of the camera 1 is not limited to such a configuration. For example, the camera 1 may be configured to perform photometry and ranging operations again upon detecting that the SW2 of the shutter switch 131 is turned on after a still image is acquired once, and to execute the exposure control or AF control during still image acquisition.

The present exemplary embodiment described above illustrates an example where the allowable difference amount $\Delta Av'$ is adjusted based on the aperture value during live view display and during still image acquisition. However, the present exemplary embodiment is not limited to such an example. For example, the depth of field varies depending not only on the aperture value, but also on the focal length or the object distance in the case of capturing an image of the object. Thus, the allowable difference amount $\Delta Av'$ may be adjusted based on the focal length or the object distance. Specifically, if the conditions other than the focal length are the same, the depth of field of a first lens unit having a shorter focal length is smaller than the depth of field of a second lens unit having a longer focal length. The allowable difference amount $\Delta Av$ obtained when the first lens unit is attached to the camera 1 is therefore set to be smaller than the allowable difference amount $\Delta Av$ obtained when the second lens unit is attached to the camera 1. The depth of field obtained when the object distance from the camera 1 to a main object (object in an in-focus state) is shorter is smaller than the depth of field obtained when the object distance is longer. The allowable difference amount $\Delta Av'$ obtained when the object distance is shorter is set to be smaller than the allowable difference amount $\Delta Av'$ obtained when the object distance is longer.

While the present exemplary embodiment described above illustrates a configuration in which the allowable difference amount $\Delta Av'$ is set when the depth simulation function is on, the present exemplary embodiment is not limited to such a configuration. For example, if the in-focus range of the object is long depending on the focal length, the object distance, and the aperture value, the necessity of performing the depth simulation is low and the necessity of driving the aperture depending on the depth simulation is also low. Thus, whether to perform the depth simulation, whether to set the allowable difference amount $\Delta Av'$, or the setting range of the allowable difference amount $\Delta Av'$ may be controlled depending on the in-focus range for the object within the angle of view. For example, in a so-called pan focus state, the calculation of the allowable difference amount $\Delta Av'$ may be omitted even when the depth simulation function is on, and the aperture 302 may be controlled not to be driven during live view display depending on the image capturing aperture for still image acquisition.

As described above, the camera 1 according to the present exemplary embodiment changes aperture driving conditions in response to changes in the luminance of the object depending on whether to execute the depth simulation. Specifically, the camera 1 according to the present exemplary embodiment preferentially changes the exposure parameters other than the aperture value in response to changes in the luminance of the object in a case where the depth simulation function is on. Also, in the case of changing the aperture value, the aperture value to be automatically set in response to changes in the luminance of the object is controlled to be discretely changed with respect to the aperture values that can be set in the camera 1.

In addition, the camera 1 according to the present exemplary embodiment determines, in a case where the depth simulation function is on, whether it is necessary to drive the aperture 302 for depth simulation depending on the difference between the aperture value for live view display and the aperture value for still image acquisition. The aperture 302 is then driven during the depth simulation only when it is determined that there is a need to drive the aperture 302 based on the determination result. This leads to a reduction in the frequency of driving the aperture 302. In particular, if it can be determined that there is only a small difference in the depth of field in an image between the aperture value for live view display and the aperture value for still image acquisition, the aperture 302 can be prevented from being newly driven. Accordingly, the camera 1 according to the present exemplary embodiment can prevent from providing the user with a feeling of strangeness due to the difference in the depth of field between a still image and an image to be displayed during the depth simulation.

The first exemplary embodiment described above illustrates a configuration in which the depth simulation is performed under the image capturing condition in which the aperture value is automatically set (e.g., the image capturing mode is set using a program). A second exemplary embodiment of the disclosure illustrates a configuration in which the depth simulation under the image capturing condition in which the aperture value is manually set by the user is also taken into consideration and the method of adjusting the allowable difference amount $\Delta Av'$ is changed depending on the image capturing condition. The configuration of the camera 1 as an image capturing apparatus according to the present exemplary embodiment and the basic driving method are substantially similar to those of the first exemplary embodiment described above, and the same components are denoted by the same reference numerals and the descriptions thereof are omitted.

Figure 5:
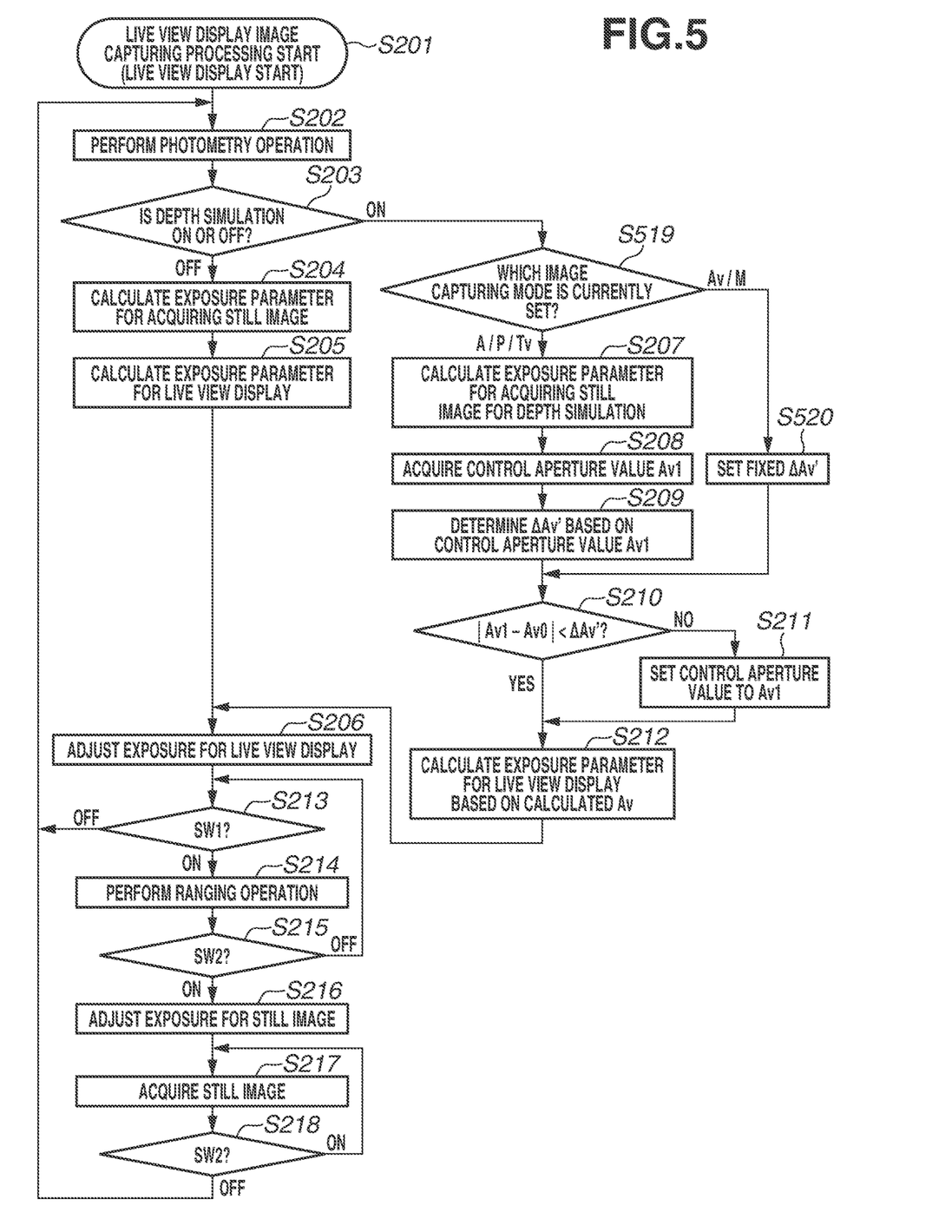
FIG. 5 is a flowchart illustrating image capturing processing during live view display according to a second exemplary embodiment of the disclosure.

FIG. 5 is a flowchart illustrating image capturing processing during live view display according to the second exemplary embodiment of the disclosure. The processes in steps of the flowchart illustrated in FIG. 5 that are identical to those in the flowchart illustrated in FIG. 2 described in the above-described first exemplary embodiment are denoted by the same step numbers and the descriptions thereof are omitted. Specifically, in image capturing processing during live view display according to the present exemplary embodiment, processing of steps S519 and S520 is added to the image capturing processing according to the first exemplary embodiment described above. The processing of steps S519 and S520 will now be described in detail.

As illustrated in FIG. 5, if it is determined that the depth simulation function is on based on the determination result in step S203 (ON in step S203), the processing proceeds to step S519. In step S519, the system control unit 120 determines the image capturing mode currently set in the camera 1. In step S519, if it is determined that the image capturing mode is set to either auto (A), program (P), or shutter speed priority (Tv), the processing proceeds to step S207 to perform processing in the same manner as in the first exemplary embodiment described above. In contrast, if it is determined that aperture priority (Av) or manual (M) is set as the image capturing mode in step S519, the processing proceeds to step S520. In other words, if the image capturing mode in which the aperture value can be manually set by the user is set as the image capturing mode, the processing proceeds to step S520.

In step S520, the system control unit 120 sets the fixed allowable difference amount $\Delta Av'$, and then the processing proceeds to step S210. Specifically, in the present exemplary embodiment, under the image capturing condition (image capturing mode) in which the aperture value is manually set by the user, the allowable difference amount $\Delta Av'$ is set to a fixed value, thereby adjusting the frequency of driving the aperture not to be changed depending on the aperture value. Specifically, in the present exemplary embodiment, when the depth simulation is executed and the aperture priority mode or the manual mode is set as the image capturing mode, a minimum value of the allowable difference amount $\Delta Av'$ that can be set in another image capturing mode is set as a fixed value.

The value of the allowable difference amount $\Delta Av'$ in the aperture priority mode or the manual mode is not limited to this value. Any value may be set as the value of the allowable difference amount $\Delta Av'$, as long as the value is less than or equal to the average value of the allowable difference amount $\Delta Av'$ that can be set when the program mode or the like is set as the image capturing mode. In other words, assuming that the same aperture value is set, the value of the allowable difference amount $\Delta Av'$ in the image capturing mode in which the aperture value is manually set by the user may be set to be smaller than that in the image capturing mode in which the aperture value is not manually set by the user. Unlike in the case of automatically determining the aperture value, it is highly likely that the user may intend to place an emphasis on a change in image quality due to the aperture value for image capturing, in a case where the aperture value is designated by the user. Accordingly, the configuration according to the present exemplary embodiment described above can be adopted to set the allowable difference amount $\Delta Av'$ to a fixed value that makes it easy to follow a change in the depth of field in response to changes in the aperture value. Such a configuration makes it possible to prevent a difference from occurring between the user's intention for image capturing and the aperture state (state of depth of field) during the depth simulation in the live view display.

As described above, the present exemplary embodiment illustrates a configuration in which the followability of the aperture for a live view display image with respect to a still image during the depth simulation is changed depending on the image capturing mode set in the camera 1. However, the present exemplary embodiment is not limited to such a configuration. For example, the adjustable amount of the allowable difference amount $\Delta Av'$, variable values, and fixed values may be changed depending on the image capturing scene.

Specifically, if the user manually sets the image capturing scene that can be set in the camera 1, or if the camera 1 automatically sets the image capturing scene, the image capturing scene instead of the image capturing mode may be determined in step S519 described above. If the image capturing scene is determined to be an image capturing scene in which an emphasis is placed on a change in image quality due to the aperture value, the processing may proceed to step SS20. If the image capturing scene is determined to be another image capturing scene different from the above-described image capturing scene, the processing may proceed to step S207. Examples of the image capturing scene in which an emphasis is placed on a change in image quality due to the aperture value may include macro image capturing and portrait image capturing. Examples of another image capturing scene may include landscape image capturing.

Preferred exemplary embodiments of the disclosure have been described above. However, the disclosure is not limited to these exemplary embodiments and can be modified and changed in various ways within the scope of the disclosure. For example, the exemplary embodiments described above illustrate a configuration for determining whether the depth simulation function is on or off. However, the disclosure is not limited to this configuration. For example, whether to perform the depth simulation may be automatically changed depending on various conditions such as the image capturing mode and a power saving control state (e.g., normal state, and power saving state) of the camera 1. In such a case, processing of determining the above-described conditions may be added instead of the step (S203) of determining whether the depth simulation function is on or off.

The exemplary embodiments are described above with reference to the program diagrams illustrated in FIGS. 3A to 3C and FIGS. 4A to 4C, assuming that the lens unit 300 is attached to the camera 1. However, if another lens unit is attached to the camera 1, the program diagrams to be used may be changed. Even if another lens unit is attached to the camera 1, the camera 1 according to the disclosure may be configured such that the aperture value is more discretely changed in response to changes in the luminance of the object when the depth simulation function is on than when the depth simulation function is off.

While the exemplary embodiments described above illustrate a configuration in which the lens unit 300 that can execute the depth simulation function is attached to the camera 1, the exemplary embodiment is not limited to such a configuration. For example, it is assumed that the resolution for the aperture value that can be set in a lens unit for driving the aperture using a motor of a type different from that of the lens unit 300 is lower than that in the lens unit 300. In a case where such a lens unit is attached to the camera 1, if the aperture value that can be set in the camera 1 is further limited, the followability may decrease due to the adjustment of the aperture diameter with respect to changes in the luminance of the object. If such a lens unit is attached to the camera 1, a configuration for preventing the depth simulation function from being turned on may be used, accordingly. In other words, the camera 1 according to the disclosure may be configured to switch on or off the depth simulation function depending on the type of the attached lens unit. Any type of lens unit may be used as long as the type of the lens unit can be determined using a connector provided on the camera mount portion 160 or the lens mount portion 320.

While the exemplary embodiments described above illustrate an example where a digital camera is used as an example of the image capturing apparatus for carrying out the disclosure, the disclosure is not limited to such an example. Any image capturing apparatus other than a digital camera, for example, a portable device such as a digital video camera or a smartphone, a wearable terminal, an in-vehicle camera, or a security camera, may also be used.

While the above-described exemplary embodiments illustrate a configuration in which the units, such as the image processing circuit 107, the memory control circuit 110, and the system control unit 120, that constitute the camera 1 operate in cooperation with each other to thereby control the operation of the camera 1, the disclosure is not limited to such a configuration. For example, a (computer) program based on the processing flow illustrated in FIG. 2 described above may be preliminarily stored in the main memory 121. The program may be executed by the system control unit 120 or the like including a microcomputer, to thereby control the operation of the camera 1.

Any program form can be used as long as the form has a program function. For example, an object code, a program to be executed by an interpreter, or script data to be supplied to an operating system (OS) may be used.

As a recording medium for supplying the program, for example, a hard disk, a magnetic recording medium such as a magnetic tape, an optical recording medium, or a magneto-optical recording medium may be used.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-076750, filed Apr. 28, 2021, which is hereby incorporated by reference herein in its entirety.

What is claimed is:

1. An apparatus that includes a sensor and is configured to control an aperture, the apparatus comprising:
    at least one processor; and
    a memory coupled to the at least one processor, the memory having instructions that, when executed by the processor, performs operations as:
    a detection unit configured to detect a luminance of an object;
    a control unit configured to execute an exposure control by adjusting at least one of, based on a result of a detection by the detection unit, a shutter speed, an aperture value, and an image capturing sensitivity; and
    a setting unit configured to switch on and off a simulation function for adjusting an image quality of an image for live view display on a display apparatus to match an image quality corresponding to an opening of the aperture for acquiring a still image for recording,
    wherein in a case where the simulation function is on, the control unit controls
    (1) a difference amount between an aperture value for acquiring the image for live view display and an aperture value for acquiring the still image depending on an aperture value for acquiring the still image for recording, and
    (2) the difference amount such that the difference amount obtained when the aperture value for acquiring the still image corresponds to a second aperture value is larger than the difference amount obtained when the aperture value for acquiring the still image corresponds to a first aperture value, the second aperture value being larger than the first aperture value, and
    wherein the image quality of the image for live view and the image quality of the still image are changed due to the aperture value for acquiring the image for live view and the aperture value for acquiring the still image, respectively.

2. The apparatus according to claim 1,
wherein a lens unit including an aperture is detachably attachable to the apparatus, and
wherein in the case where the simulation function is on, the control unit controls the difference amount to be varied depending on a type of the lens unit attached to the apparatus.

3. The apparatus according to claim 2, wherein in the case where the simulation function is on, the control unit controls the difference amount such that the difference amount obtained when a second lens unit having a focal length shorter than the focal length of a first lens unit is attached to the apparatus is smaller than the difference amount obtained when the first lens unit is attached to the apparatus.

4. The apparatus according to claim 1, wherein in the case where the simulation function is on, the control unit controls the difference amount to be varied depending on a distance from the apparatus to a main object.

5. The apparatus according to claim 4, wherein in the case where the simulation function is on, the control unit controls the distance amount such that the difference amount obtained when the distance from the apparatus to the main object corresponds to a second distance is smaller than the difference amount obtained when the distance corresponds to a first distance, the second distance being shorter than the first distance.

6. The apparatus according to claim 1, wherein the control unit controls the difference amount in the simulation function to be varied depending on a mode set in the apparatus.

7. The apparatus according to claim 6, wherein the control unit controls the difference amount such that the difference amount obtained in a first mode in which a user is allowed to set the aperture value is smaller than the difference amount obtained in a second mode in which the user is prohibited from setting the aperture value.

8. The apparatus according to claim 1, wherein the setting unit switches on and off the simulation function according to a manual operation by a user in a state where a menu for the simulation function is displayed on a display unit.

9. The apparatus according to claim 1, wherein the setting unit switches on and off the simulation function depending on a mode to be set in the apparatus.

10. The apparatus according to claim 1, wherein the setting unit switches on and off the simulation function depending on a type of a lens unit attached to the apparatus.

11. A method for an apparatus, the apparatus including a sensor and being configured to control an aperture, the method comprising:
detecting a luminance of an object;
controlling for executing exposure control by adjusting at least one of, based on a luminance of an object, a shutter speed, an aperture value, and a sensitivity; and
switching on and off a simulation function for adjusting an image quality of an image for live view display on a display apparatus to match an image quality corresponding to an opening of the aperture for acquiring a still image for recording,
wherein in a case where the simulation function is on, the controlling controls
(1) a difference amount between an aperture value for acquiring the image for live view display and an aperture value for acquiring the still image depending on an aperture value for acquiring the still image for recording, and
(2) the difference amount such that the difference amount obtained when the aperture value for acquiring the still image corresponds to a second aperture value is larger than the difference amount obtained when the aperture value for acquiring the still image corresponds to a first aperture value, the second aperture value being larger than the first aperture value, and
wherein the image quality of the image for live view and the image quality of the still image are changed due to the aperture value for acquiring the image for live view and the aperture value for acquiring the still image, respectively.

12. The method according to claim 11, wherein in the case where the simulation function is on, the controlling controls the difference amount to be varied depending on a distance from the apparatus to a main object.

13. The method according to claim 11, wherein the controlling controls the difference amount in the simulation function to be varied depending on a mode set in the apparatus.

14. The method according to claim 11, wherein the switching switches on and off the simulation function according to a manual operation by a user in a state where a menu for the simulation function is displayed on a display unit.

15. The method according to claim 11, wherein the switching switches on and off the simulation function depending on (1) a mode to be set in the apparatus or (2) a type of a lens unit attached to the apparatus.

16. A non-transitory computer-readable storage medium storing programs for causing a computer to perform a method of controlling an apparatus including an element, the method comprising:
detecting a luminance of an object;
controlling for executing exposure control by adjusting at least one of, based on a luminance of an object, a shutter speed, an aperture value, and a sensitivity; and
switching on and off a simulation function for adjusting an image quality of an image for live view display on a display apparatus to match an image quality corresponding to an opening of the aperture for acquiring a still image for recording,
wherein in a case where the simulation function is on, the controlling controls
(1) a difference amount between an aperture value for acquiring the image for live view display and an aperture value for acquiring the still image depending on an aperture value for acquiring the still image for recording, and
(2) the difference amount such that the difference amount obtained when the aperture value for acquiring the still image corresponds to a second aperture value is larger than the difference amount obtained when the aperture value for acquiring the still image corresponds to a first aperture value, the second aperture value being larger than the first aperture value, and
wherein the image quality of the image for live view and the image quality of the still image are changed due to the aperture value for acquiring the image for live view and the aperture value for acquiring the still image, respectively.

17. The non-transitory computer-readable storage medium according to claim 16, wherein in the case where the simulation function is on, the controlling controls the difference amount to be varied depending on a distance from the apparatus to a main object.

18. The non-transitory computer-readable storage medium according to claim 16, wherein the controlling controls the difference amount in the simulation function to be varied depending on a mode set in the apparatus.

19. The non-transitory computer-readable storage medium according to claim 16, wherein the switching switches on and off the simulation function according to a manual operation by a user in a state where a menu for the simulation function is displayed on a display unit.

20. The non-transitory computer-readable storage medium according to claim 16, wherein the switching switches on and off the simulation function depending on (1) a mode to be set in the apparatus or (2) a type of a lens unit attached to the apparatus.

* * * * *